(12) United States Patent
Scheurn

(10) Patent No.: US 7,387,483 B1
(45) Date of Patent: Jun. 17, 2008

(54) AWNING GROOVE ACCESSORY STOP

(75) Inventor: Kenneth Charles Scheurn, 2138 Ruskin Ave., Thousand Oaks, CA (US) 91360

(73) Assignee: Kenneth Charles Scheurn, Thousand Oaks, CA (US)

( * ) Notice: Subject to any disclaimer, the term of this patent is extended or adjusted under 35 U.S.C. 154(b) by 139 days.

(21) Appl. No.: 11/240,735

(22) Filed: Nov. 3, 2005

(51) Int. Cl.
F16B 21/02 (2006.01)
E04H 15/08 (2006.01)

(52) U.S. Cl. .......................... 411/349; 160/67
(58) Field of Classification Search .................. 411/84, 411/85, 533, 549, 349; 160/22, 66, 67
See application file for complete search history.

(56) References Cited

U.S. PATENT DOCUMENTS

| 2,601,213 | A | * | 6/1952 | Poupitch | 52/489.1 |
|---|---|---|---|---|---|
| 3,266,202 | A | * | 8/1966 | Furer | 52/39 |
| 4,647,262 | A | * | 3/1987 | Yokota | 411/44 |
| 4,657,462 | A | * | 4/1987 | Hoen | 411/552 |
| 4,759,396 | A | | 7/1988 | Quinn | |
| 4,770,586 | A | * | 9/1988 | Osterland | 411/349 |
| 4,783,040 | A | * | 11/1988 | Lindberg et al. | 248/74.3 |
| 5,601,267 | A | * | 2/1997 | Caine | 248/223.41 |
| 5,697,590 | A | * | 12/1997 | Hull et al. | 248/225.11 |
| 5,718,253 | A | * | 2/1998 | McNamee | 135/88.13 |
| 6,279,640 | B1 | | 8/2001 | Van Lennep | |
| 6,792,993 | B1 | | 9/2004 | Forbes | |
| 7,152,838 | B2 | * | 12/2006 | Taulbee | 248/307 |

* cited by examiner

Primary Examiner—Flemming Saether

(57) ABSTRACT

A small twisting type lock/stop (7) that when placed into an awning accessory groove (16) and twisted a ¼ turn will lock in place. Any accessories placed in this groove can be adjusted to their desired position, then locked into place with the accessory stop (7). This will prevent any unnecessary adjustments or damage to the accessories caused by the elements or human error. This can be made of many light weight materials, making it easy for anyone to use.

2 Claims, 4 Drawing Sheets

AWNING GROOVE ACCESSORY STOP

CROSS-REFERENCE TO RELATED APPLICATIONS

Not Applicable

FEDERALLY SPONSORED RESEARCH

Not Applicable

SEQUENCE LISTINGS OR PROGRAM

Not Applicable

FIELD OF INVENTION

This invention relates to a twist stop that locks awning accessories in place in the groove of a recreational vehicle or residential homes awning tube.

BACKGROUND OF INVENTION

When awnings are extended from recreational vehicles or residential homes the exterior tube has a groove for decorative lights, windsock, fans and other accessories.

At this point in time most people use a metal screw wedged in the groove, piece of cork or even rubber to secure these items in place.

OBJECTS AND ADVANTAGES

Accordingly, besides the several objects and advantages of the invention are twist stop described in my above patent, several objects and advantages of the present invention are:

(a) To provide a twist stop that will lock in place and prevent accessory items that are put inside an awning groove from becoming damaged by sliding around;

(b) To provide a twist stop that can be purchased inexpensively in a variety of quantities;

(c) To provide a twist stop that is small and easy to operate;

(d) To provide a twist stop that can be used in any size awning tube groove;

(e) To provide a twist stop that can be produced either in metal, plastic, rubber or foam in a variety of colors;

(f) To provide a twist stop that is non-obtrusive when applied.

SUMMARY

In accordance with the present invention an awning groove accessory stop comprises of a thin body. Two pressure notches at the top of the body, a pressure tip at the bottom, and a twist knob at the top of the body. The twist knob is circular with a finger gripping bar on top.

DRAWINGS

Figures

In the drawings, closely related figures have the same number but different alphabetic suffixes.

DESCRIPTION OF THE PREFERRED EMBODIMENT

Figure 1:
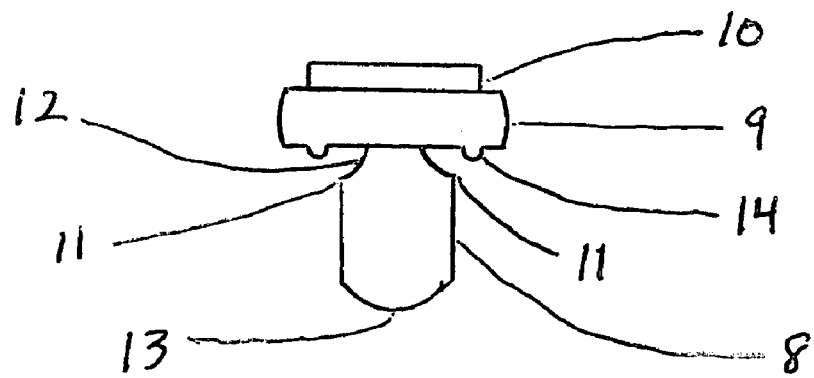
FIG. 1 shows a side view of the awning groove accessory stop.
Figure 2:
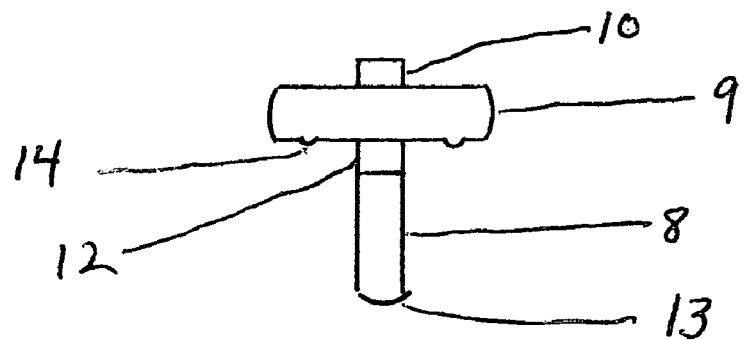
FIG. 2 shows a front view of the awning groove accessory stop.
Figure 3:
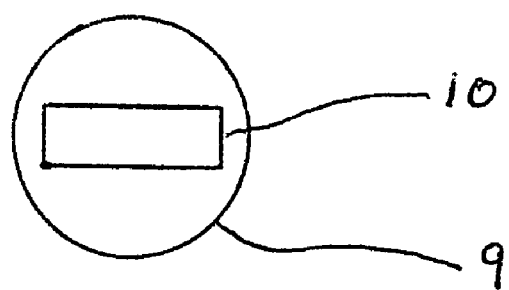
FIG. 3 shows a top view of the awning groove accessory stop.

The present invention finds primary utility use in a retractable awning accessory groove 16. As shown in the accompanying FIG. 1-4 show different views of the awning groove accessory stop. FIG. 1-2 show a thin main body 8 that projects down from the twisting knob 9, which has a finger grip 10 on top. Locking groove 12 along with pressure points 11, 13 and pressure nubs 14. FIG. 3 is a top view that shows the twist knob 9 and the finger grip 10.

Figure 4:
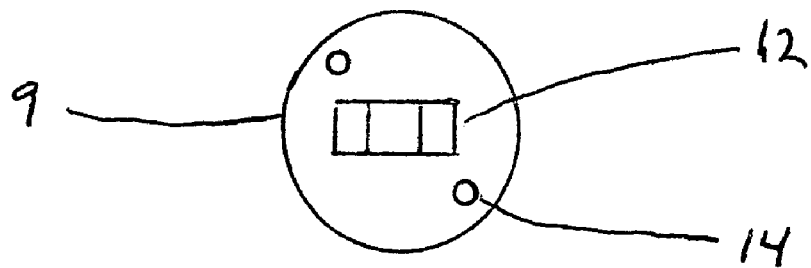
FIG. 4 shows a bottom view of the awning groove accessory stop.
Figure 5:
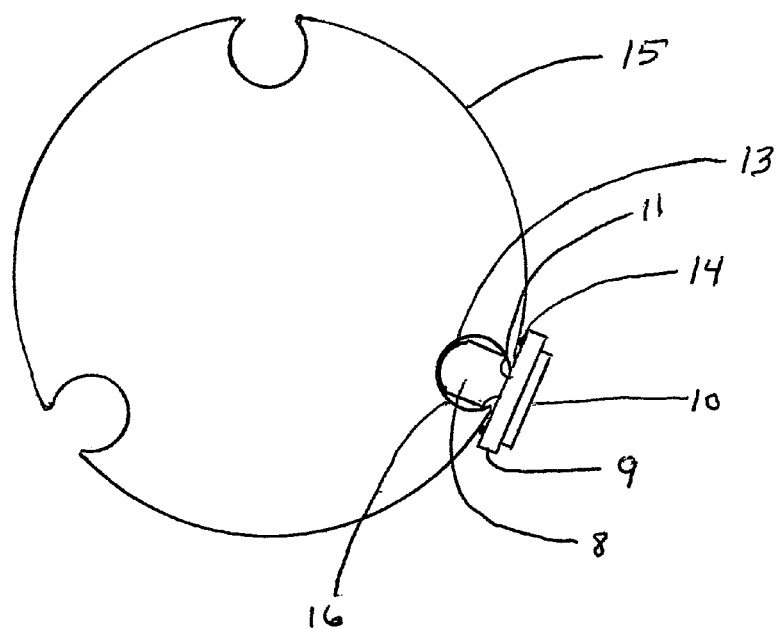
FIG. 5 shows a fragmentary perspective side view of an awning roller body with the awning groove accessory stop locked into place.
Figure 6:
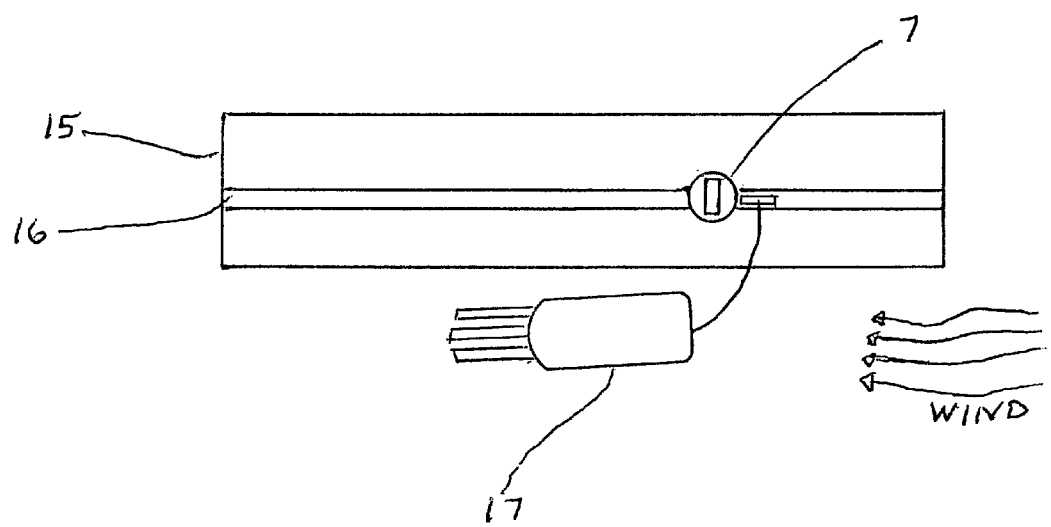
FIG. 6 shows fragmentary perspective front view of an awning roller body with the awning groove accessory stop locked into place, keeping the wind from moving a windsock down the tube.

FIG. 4 shows the bottom view of the accessory stop. The twist knob 9 and a dissected view of the locking groove 12 along with the pressure nubs 14. FIG. 5 shows the main body 8 locked into place of the awning roller body 15. It shows pressure nubs 14 applying direct pressure to the outside of the awning roller body 15. The pressure points 11, 13 are applying inside the awning accessory groove 16. FIG. 6 shows the awning groove accessory stop 7 locked into place of the awning accessory groove 16 of the awning roller body 15. The windsock 17 is being held in place by the awning accessory groove stop 7, while the wind is blowing.

The awning accessory groove stop 7 is a one piece unit can be made out of plastic, metal, hard rubber, or hard foam rubber.

In the preferred embodiment the main body 8 is between ¼ & ⅜ inches long and no more than ⅛ inch wide. The twist knob 9 is between ½ and ⅝ inches in diameter. The finger grip 10 is between ⅛ and ¼ inches wide and between ½ and ⅝ inches long. The locking groove is approximately 1/16 inch deep and 3/32 inch wide, and is located at the top of the main body 8 below the twist knob 9.

When placing the above awning accessory groove stop body 8 sideways into the awning accessory groove 16 and turning the finger grip 10 ¼ turn to the right will lock in place. The finger grip will be pointing up. The pressure nubs will put direct pressure onto the outside of the awning roller body 15, the top pressure point 11 will be applying direct pressure to the underside of the awning accessory groove 16 lip and the bottom pressure point 13 will be applying direct pressure to the bottom of the accessory groove 16.

Accordingly, the reader will see that the awning accessory groove stop of this invention can be used to stop awning accessories such as windsock, lights, fans, and other decorations from being damaged by the wind or other elements when they are unintentionally moved inside the awning groove. This will alleviate the user from having to continually replace or adjust such items when in place.

Although the description above contains many specifications, these should not be construed as limiting the scope of the invention but as merely providing illustrations of some of the presently preferred embodiments of this invention. For example the twisting knob can have other shapes and sizes, such as circular, oval, triangular, octagon, etc.; the locking groove can be straight or of a sweeping angle.

Thus the scope of the invention should be determined by the appended claims and their legal equivalents, rather than the examples given.

I claim:

1. A twist stop for an awning accessory groove comprising:
   a. a round twisting knob having a top surface with a bottom surface with a rectangular finger grip on the top surface;
   b. a main body projecting from the bottom surface having a generally rectangular shape with an axial length from the bottom surface to a distal end being greater than a width in the transverse direction, the distal end having a curved surface across the width for applying pressure against an inside of the accessory groove;
   c. two locking grooves where the main body meets the bottom surface, said locking grooves having a curved concave surface facing the bottom surface defining pressure points for applying pressure against an inside of the accessory groove at a location generally opposite the distal end;
   d. two pressure nubs on the bottom surface of the twisting knob for applying pressure against an outside of the accessory groove;
   e. wherein the twist stop can be installed into the accessory groove with a quarter turn without the use of tool preventing awning accessory items from moving within the accessory groove.

2. A twist stop according to claim 1 produced in either metal, plastic, rubber or foam in any one of a variety of colors.

\* \* \* \* \*